United States Patent [19]

Inoue

[11] Patent Number: 4,859,061
[45] Date of Patent: Aug. 22, 1989

[54] FLATNESS EXAMINING DEVICE

[75] Inventor: Katsuyo Inoue, Hino, Japan

[73] Assignee: Konishiroku Photo Industry Co., Ltd., Tokyo, Japan

[21] Appl. No.: 122,536

[22] Filed: Nov. 12, 1987

Related U.S. Application Data

[63] Continuation of Ser. No. 715,535, Mar. 25, 1985.

[30] Foreign Application Priority Data

Mar. 31, 1984 [JP] Japan ................................. 59-64550

[51] Int. Cl.⁴ .............................................. G01B 9/02
[52] U.S. Cl. .................................................... 356/359
[58] Field of Search ........................ 356/349, 359, 360

[56] References Cited

U.S. PATENT DOCUMENTS 3,891,320 6/1975 Kimura et al. ...................... 356/359
4,072,423 2/1978 Kimura et al. ...................... 356/357
4,293,218 10/1981 Nielsen et al. .................... 350/6.2 X
4,325,637 4/1982 Moore ................................ 356/359

Primary Examiner—Davis L. Willis
Assistant Examiner—Matthew W. Koren
Attorney, Agent, or Firm—Jordan B. Bierman

[57] ABSTRACT

A flatness examining device which comprises a radiation beam generating means, an objective lens, an optical means having a reference plane wherein a test plane to be measured is placed opposite to the reference plane and the optical means introduces the radiation beam onto both the reference plane and the test plane to produce an interference fringe, a parallel plate member in the radiation beam path between the objective lens and the optical member, and the parallel plate member is capable of changing its inclination by a predetermined angle against the radiation beam path. The incidence of the light beam on the reference plane is changed by shifting the radiation beam slightly so that the test plane can be measured whether or not it is convex or concave.

7 Claims, 1 Drawing Sheet

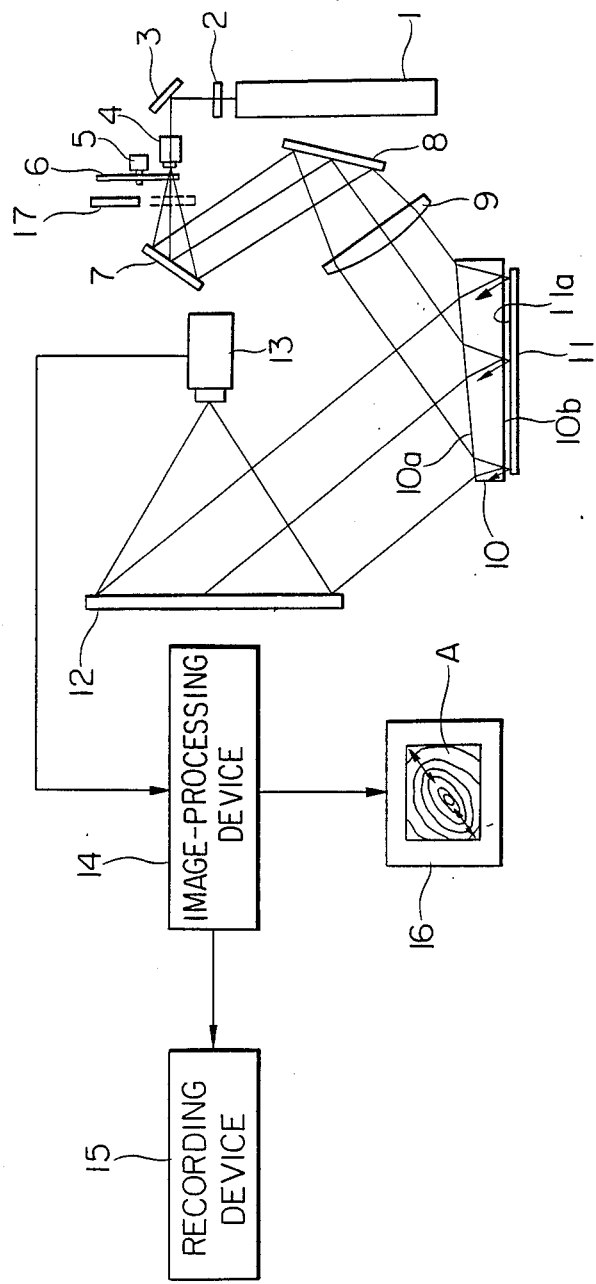

FLATNESS EXAMINING DEVICE

This application is a continuation of application Ser. No. 715,535, filed Mar. 25, 1985.

BACKGROUND OF THE INVENTION

1. Field of the Invention

This invention relates to the flatness examining device designed to display the interference fringe of the reflecting lights that are reflected at the reference plane of the optical member and at the measured plane of the sample, with the aid of the oblique-incidence interference method.

2. Description of the Prior Art

As known well, the oblique-incidence interference method is designed that with the use of two media being separated by the reference plane and having different refractive indices, a paralleled light flux is obliquely incidented, through said media, onto the measured plane of the sample that is placed in parallel to the reference plane. The optical-path difference of the reflecting lights, which reflected at the reference plane and at the measured plane, would produce the interference fringe. The state of the fringe will aid to know the flatness on the measured plane.

As an example for the flatness examining device, to which the oblique incidence interference method is applied, there is a type as described in Japanese Patent Examined Publication No. 074/1978, that the interference fringe is displayed through an image formation lens on a screen. This interference fringe represent the pattern of concave or convex state of the measured plane. The state of the measured plane, concave or convex, can be determined based on the observation of this pattern.

In the past, the state of the measured plane, concave or convex, was determined by a light push given to the sample in the manner that if the interference fringe expand inward in increased quantity, the measured plane would represent concave, and if the fringe expand outward in reduced quantity, the measured plane represents convex.

However, direct push onto the sample would cause a flaw or dirt on the surface of the sample, or relatively large pus would largely change the degree of variation of concave or convex state. Further, if the sample is large, difference between the variation caused at a push point and the variation at a distant point would result in difficulty or retardation for determination.

SUMMARY OF THE INVENTION

Object of the Invention

This invention was made under the above circumstances. The device need not direct contact with the sample to determine concave or convex state of the measured plane. The device permits simple and accurate judgment for a large measured plane. Further, it is aimed at simple manipulation to discern the flatness.

Constitution of the Invention

To attain the abovementioned objective, this invention is designed that the measured plane of the sample is placed in opposite to the reference plane of the optical member, and with the use of the flatness examining device, which displays the interference fringe of the reflecting lights that are reflected at the reference plane and at the measured plane, laser beams are enlarged with an objective lens and then a pattern recognizing member is inserted into a light flux with reduced coherence to change angle as specified and to change angle of incidence against the aforementioned optical member, which subsequently results in discernment of concave or convex state of the measured plane of the sample.

Effect of the Invention

Therefore, the device permits discrimination of concave or convex state of the measured plane of the sample without direct contact, which results in no flaw and dirt on the sample. Further for a large measured plane, it functions only with a minor change of the angle of the incidence. It permits simple handling as well as simple and accurate judgment.

BRIEF DESCRIPTION OF THE INVENTION

The drawing shows an example of the invention.

DETAILED DESCRIPTION OF THE INVENTION

Details of an example of the invention are given based on the attached drawing as follows.

Example

In the drawing, 1 denotes a laser oscillator. Laser beams from this laser oscillator 1 are projected through the filter 2 and reflected at the reflection mirror 3. The reflected beams are designed to be incident into the objective lens 4, which enlarges the incident laser beams. In front of the objective lens 4, the ground-glass-made diffusion plate 6, which revolves by the motor 5, is arranged near the focus of the objective lens 4. This diffusion plate 6 works to degrade coherence of laser beams.

Enlarged light flux is reflected by the reflection mirror 7 and 8 respectively, which is incidented into the collimator lens 9. The collimator lens 9 is designed to have the incident beams parallel and discharge them. The paralleled light flux is incidented into an optical member, Wedge Standard 10.

This Wedge Standard 10 is formed in the plate shape. The incident plane 10a, where the parallel light flux is incidented, is inclined at a given angle. The reference plane 10b is positioned opposite to the incident plane 10a. Facing to 10a and 10b, the sample 11 is placed at a given interval. The Wedge Standard 10 is designed in a plate shape and light weight. Since the incident plane 10a is arranged above the wedge, a collimator lens 9 with a small diameter can be used. This allows a small-sized device.

A paralleled light flux incidented obliquely against the incident plane 10a of Wedge Standard 10, will reflect at the reference plane 10b of the Wedge Standard 10, and also reflect at the measured plane 11a after passing the medium (air) with different refraction index, which is separated by the reference plane 10b. Then, the reflected light is taken out of the incidental plane 10a of Wedge Standard 10 The reflected light that was reflected at the reference plane 10b and the abovementioned measured plane 11a, will reflect at the reflection plate 12. The interference fringe A that is generated by the optical-path difference made by the above two reflection, will assist us to know the flatness of the measured plane 11a.

This interference fringe A will be read by the pickup device 13, and processed by the image processing device 14, then output to the recorder 15 or the indicator 16.

A TV camera is adopted for the pickup device 13. A printer or hard copy is adopted for the recorder 15. And, a TV monitor is adopted for the indicator 16.

A pattern-recognizing member 17 is inserted in the optical path made between the abovementioned diffusion plate 6 and the reflection mirror 7. This pattern-recognizing member 17 is made for example, of transparent glass, which will be automatically inserted with a switch button, by the medium of a driving device (not shown in the drawing) when it is measured to know the state of the interference fringe A, concave or convex.

The pattern-recognizing member 17 is designed to move repeatedly within a range of about 0°-30° at a right angle against the optical axis, or it is able to wave at a fixed point. In this connection, with the aid of refraction at the pattern-recognizing member 17, the angle of the paralleled light flux incidented through the reflection mirror 7 and 8 and collimator lens 9, to Wedge Standard 10 will be changed. This pattern-recognizing member 17 for example with 5-10 mm thickness, will limit the variation of the incidented angle, which allows easy observation for concave or convex state of the interference fringe A. If the fringe moves inward in increased quantity, the measured plane represents convex. If the fringe moves outward in less quantity, the measured plane represents concave.

As the pattern-recognizing, member 17 is arranged near the diffusion plate 6, its size can be limited.

Nextly, this application example will be explained based on the attached drawing.

Laser beams generated from the laser oscillator 1 pass through the filter 2 and will be reflected at the reflection mirror 3.

Next, the laser beams are enlarged with the objective lens 4, and its coherence is degraded by the revolution of the diffusion plate 6. Then, the laser beams are reflected by the reflection mirror 7 and 8, and input into the collimator.

The incidented light turns to a paralleled light flux with the collimator lens 9, which is incidented obliquely onto the plane of incidence 10a of Wedge Standard 10, then reflected at the reference plane 10b of the wedge 10 and at the measured plane 11a of the sample 11 respectively. The reflected light is taken out of the plane of incidence 10a of Wedge Standard 10.

The reflected light is reflected at the reference plane 10b and the measured plane 11a. The interference fringe A that is generated due to the optical-path difference will be read by the pickup device B and processed with the image processing device 14, which will be output to the recorder 15 or the indicator 16.

When the state of the interference fringe A of the sample 11, concave or convex, is to be determined, turning the switch will have the drive device (not shown) to insert the pattern-recognizing member 17 into optical path. The pattern-recognizing member 17 will move repeatedly within a range of 0°-30° at a right angle against the optical axis, or revolves at a fixed point with the aid of the refraction at the pattern-recognizing member 17, the angle of the paralleled light flux incidented through the reflection mirror 7 and 8 and the collimator lens 9, will be changed.

Thus, increased or reduced stripes of the interference fringe A that are displayed on the indicator 16, will permit the identification for concave or convex state of the measured plane of the sample.

A prism standard can be used as a substitute for Wedge Standard 10. The pickup device 13 may be reformed to move along the axis to control the size of the interference fringe.

What is claimed is:

1. A flatness examining device comprising
  a radiation beam generating means,
  an objective lens for enlarging a radiation beam,
  a converting means for converting said enlarge radiation beam into a parallel beam,
  an optical means having a reference plane, in which a test plane to be measured is placed opposite said reference plane and said optical means introduces said parallel beam at an incident angel onto both said reference plane and said test plane produce at least one interference fringe, and
  a pattern recognizing member capable of transmitting said enlarged radiation beam therethrough in a radiation beam path between said objective lens and said converting means, said pattern recognizing member adapted to be inserted into and removed from said path and capable of changing its inclination by a predetermined angle to the radiation beam path so that said pattern recognizing member can shift the enlarged radiation beam, thereby changing the incident angle of said parallel beam onto said reference plane, whereby whether the test surface is convex or concave is recognized.

2. The device of claim 1, wherein said radiation beam is a visible light beam.

3. The device of claim 1, wherein said pattern recognizing member is glass.

4. The device of claim 1, wherein said angle is about 60° to 90°.

5. The device of claim 4, wherein said pattern recognizing is capable of being repeatedly moved.

6. The device of claim 1, wherein the thickness of said member is 5 mm to 10 mm.

7. The device of claim 1, further comprising an indicator for displaying said interference fringe.

* * * * *